Feb. 24, 1970 D. E. BIDDLE 3,497,802
METHOD AND APPARATUS FOR DETECTING NARROW STREAKS AND THE
AVERAGE VALUE OF A PROPERTY OVER A RELATIVELY WIDE
REGION UTILIZING A SINGLE PROBE
Filed Feb. 4, 1966 2 Sheets-Sheet 1
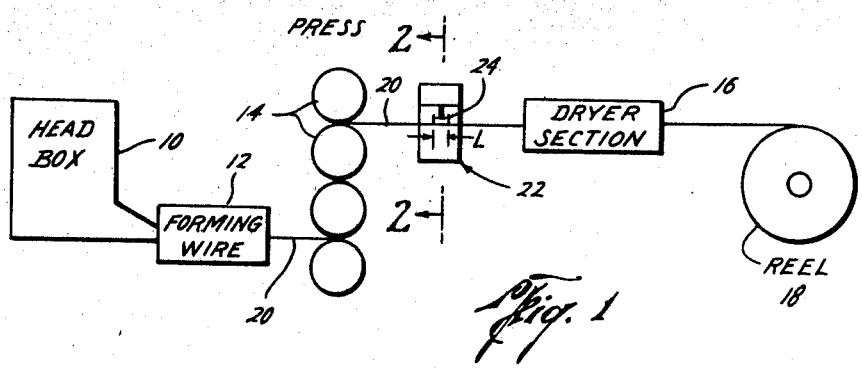
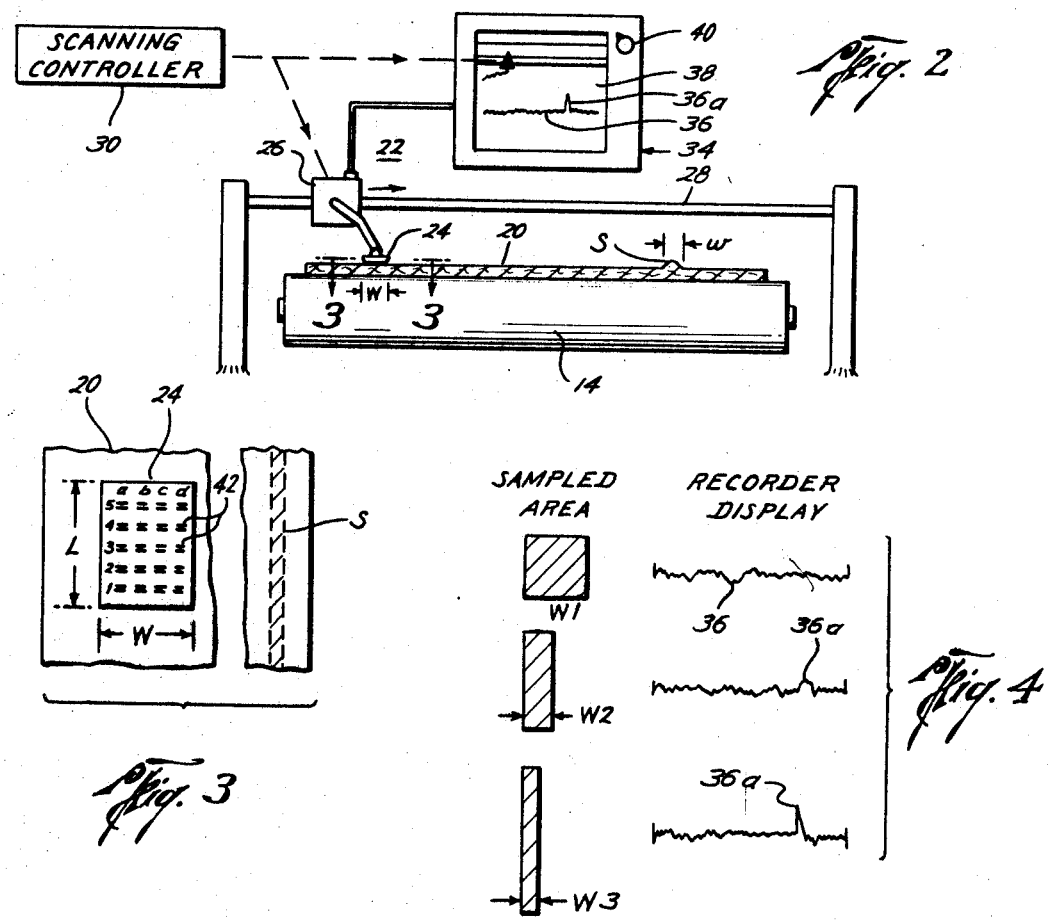
INVENTOR.
Donald E. Biddle
BY
James J. O'Reilly
AGENT

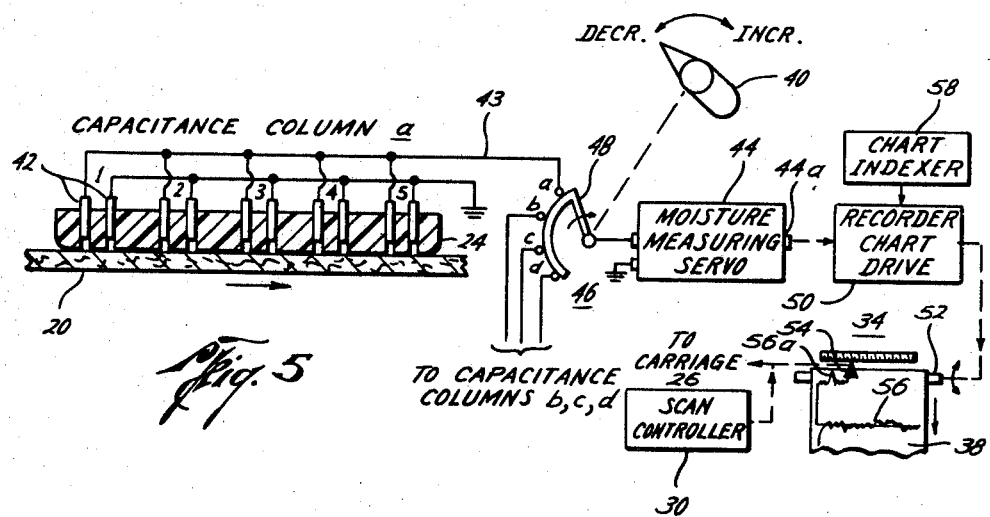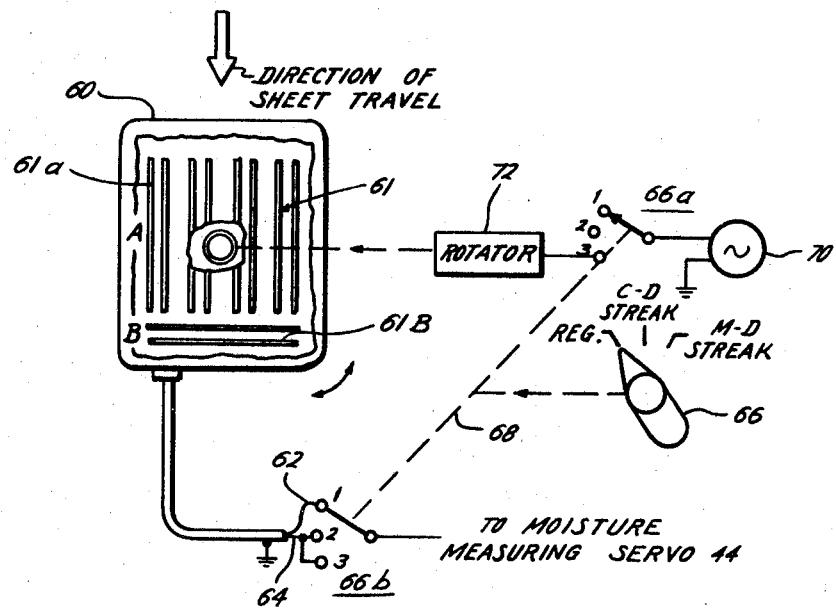

United States Patent Office 3,497,802
Patented Feb. 24, 1970

3,497,802
METHOD AND APPARATUS FOR DETECTING NARROW STREAKS AND THE AVERAGE VALUE OF A PROPERTY OVER A RELATIVELY WIDE REGION UTILIZING A SINGLE PROBE
Donald E. Biddle, Harrison, Ohio, assignor to Industrial Nucleonics Corporation, a corporation of Ohio
Filed Feb. 4, 1966, Ser. No. 525,166
Int. Cl. G01r 27/26; G01t 1/16
U.S. Cl. 324—61                                           11 Claims

ABSTRACT OF THE DISCLOSURE

A gauge for detecting narrow moisture streaks, as well as the average value of moisture over a relatively wide region, of a traveling sheet includes a probe having a plurality of electrode pairs disposed across the sheet width. In accordance with one embodiment, the narrow streak is detected by varying the number of electrode pairs connected to an indicator. In accordance with a second embodiment, another pair of electrodes is provided at right angles to the orientation direction of the first-named electrodes. The probe is rotated so that either set of electrodes is connected to an indicator to provide both responses.

This invention relates generally to moisture gauges and, more particularly, to an improved method and means for improving the speed of response of a flat sheet moisture gauge.

BACKGROUND

The moisture content of various materials has been measured by transducers operating on many different principles. For example, in some cases the moisture content of a sheet material can be correlated with a thermal property such as the temperature difference between two points on the sheet. Variation in an electrical property of the sheet frequently provides a more reliable indication of changes in sheet moisture content. It has been found that the dielectric properties of the sheet vary significantly with its moisture content, permitting the use of capacitance transducers employing metallic electrodes in communication with the sheet. Most transducers have measured the moisture of the sheet in a sampling area roughly equivalent to the area of the transducer adjacent to the sheet.

Irrespective of what type of transducer is used, it has been difficult to resolve and detect rapid changes in the moisture content of the sheet such as would be presented to a stationary single-point gauge positioned over a fast-moving sheet or to a cross-sheet scanning gauge passing over a relatively narrow streak of high moisture content running longitudinally down the sheet. Moisture streaks particularly have long presented a problem to the paper manufacturing and coating industry, because they precipitate sheet buckling and breakage if they are not detected and corrected. For example, a continuous paper sheet is frequently wound under tension on a rewind reel to provide a tight roll. If wet streaks are present, the sheet will tend to buckle and the tension must be reduced to prevent tearing of the sheet.

BRIEF DESCRIPTION OF THE INVENTION

The present invention provides a method and apparatus for measuring the moisture content of a sheet with a response time that is sufficiently short to enable the detection of moisture streaks in the sheet. This is provided by reducing the size of the transducer's sampling area in the direction of relative movement of the transducer and the sheet. This can be accomplished in the case of the scanning gauge by providing a probe having a reduced cross-sheet width. The narrower the width is made the better the streak resolution becomes.

Existing probes may be modified by removing some of the electrodes along either side of the probe to reduce its effective cross-sheet sampling dimension. Alternatively, these electrodes can be uncoupled from the measuring circuit or grounded to the frame of the instrument. I also provide a rectangular probe that can be electrically modified to provide a fast response in a machine direction rather than in a cross-sheet direction. Manually-operated switches can be mounted on an indicator panel to select a response time sufficiently fast to resolve the width of streak being measured. For example, a faster response is required to resolve a narrow streak than a wider one of the same moisture content.

The variations in probe capacitance are translated by a measuring circuit into a signal proportional to moisture content. I prefer to indicate the signal on any $x$–$y$ chart recorder whereby moisture variations of a scanning gauge appear as vertical trace variations off of a horizontal axis scaled to the width of the sheet being measured. The location of the streak in the sheet can be readily visually interpreted from the lateral position of the emphasized trace on the chart.

OBJECTS

Accordingly, it is a primary object of the present invention to provide a moisture gauging method and apparatus having an improved speed of response.

It is also an object of the present invention to provide a moisture streak detector.

It is also another object of the present invention to provide a moisture gauging system that may be readily adapted to instruments already in use.

It is yet another object of the present invention to provide a moisture gauging system that is economical to construct and maintain.

It is still another object of the present invention to provide a method and means for determining the location of one or more wet streaks in a traveling sheet of paper.

FIGURE DESCRIPTION

FIG. 1 is a diagrammatic view of a papermaking process comprising a preferred embodiment of the present invention;

FIG. 2 is a sectional view taken on the lines 2—2 of FIG. 1;

FIG. 3 is a sectional view taken on the lines 3—3 of FIG. 2;

FIG. 4 illustrates the effect of decreasing the width of the sampling area of the streak detector shown in FIG. 3;

FIG. 5 is a schematic circuit diagram partly in section illustrating one method of increasing the response of a capacitance transducer to detect moisture streaks; and FIG. 6 shows an alternative embodiment of the present invention which combines the features of a moisture gauge and a bidirectional streak detector.

CONSTRUCTION OF THE PRESENT INVENTION

With reference now to the drawings and particularly to FIGS. 1 and 2, the present invention is described in connection with a papermaking process but it may find use in measuring the moisture characteristics of any product, fibrous or otherwise. The papermaking process includes a sheet forming section comprising a headbox 10 and a forming wire 12, a press section having a plurality of rolls 14, a dryer section 16, and a reel 18. An aqueous fiber stock mixture is deposited onto the forming wire 12 to provide a continuous sheet 20 that is subsequently dried in the press and dryer sections. The illustrated process is greatly simplified, since there are many refinements not shown that are in wide use but the illustration of which would serve little advantage in explaining the operation of my gauging system.

In the initial stages of the process, the sheet 20 has a moisture content over 90%. This is gradually reduced by utilizing gravitational, thermal and other forces until a final sheet having about 7% moisture is attained, depending on the weight and quality of paper being manufactured. It has been difficult, however, to maintain a uniform moisture content at a given location in the process. Due to irregularities in the operation of the moisture removal systems, streaks of high moisture content relative to the remainder of the sheet appear. These streaks usually run longitudinally down the sheet in the machine direction but transverse streaks may result from an irregular press roll or other member extending across the sheet. Regardless of their orientation, moisture streaks eventually precipitate a break in the sheet and must be detected and elimiated to prevent shutdown of the line.

To detect streaks that originate in the press section 14 or prior thereto, I position a moisture gauge 22 ahead of the dryer section 16. Moisture gauge 22 is constructed as hereinafter explained to provide a fast speed of response to moisture streaks in the sheet 20 and traveling relative to the gauge 22. The gauge 22 senses moisture content of the sheet by means of a contacting probe 24. By fixing the position of the probe 24 relative to the edges of the sheet and reducing its machine direction length L, I emphasize the response of gauge 22 to moisture streaks extending across the sheet. Uusually, since streaks of less than two inches width are normally encountered, a probe length of this order of magnitude or smaller is desirable.

While a stationary single point gauge will detect rapid variations in moisture occurring in the machine direction, a scanning gauge or several single point gauges are desired to resolve the more common longitudinal streak S that is shown in cross-section in FIG. 2. Scanning capability is provided by using a carriage 26 mounted on traversing rods 28 and programmed for movement back and forth across the sheet 20 by a scanning controller 30. Alternatively, the probe 24 can be manually supported for movement across the sheet 20 by an operator. The carriage 26 supports the probe 24 adjacent to the sheet 20. A signal proportional to the moisture content of the sheet 20 is transmitted over a cable 32 to a recorder 34 that traces a profile 36 of the cross-sheet moisture content on a chart 38. A control knob 40 is used to increase the speed of response of the system. The horizontal axis of the profile readout may be calibrated in terms of sheet width.

Referring to the enlarged view of the probe 26 shown in FIG. 3, it is observed to be generally rectangular in shape with a plurality of electrodes 42 arranged in four columns, $a$, $b$, $c$, and $d$ each having five electrode pairs arranged in rows numbered 1–5. Alternatively, each column may comprise a pair of long electrodes. The electrode pairs define a measuring or sampling area $$A = LW$$

where L and W are the respective machine direction and cross-sheet dimensions of the probe 24. The electrode pairs define individual capacitors whose total capacitance is changed by the moisture content of the adjacent sheet 20. Other probe constructions and electrode configurations may be utilized, but the rectangular capacitance type lends itself particularly well for purposes of describing the present invention and the modification necessary to adapt other probe electrode configurations will be apparent to those skilled in the art.

The response of the instrument to a longitudinal streak S is augmented or emphasized by reducing the width W of the probe's effective measuring or sampling area. This effect is graphically illustrated by FIG. 4. Sampled areas of three different widths $W_1$, $W_2$ and $W_3$ are shown side-by-side with the recorder display generated by their use. The large vertical displacement 36a is indicative of a portion of the sheet having a high moisture content. The sharpness with which it is displayed improves as the width of the sampled area is reduced. With the wider areas, the moisture content of the narrow streak S is averaged with the lower moisture content of the areas of the sheet 20 lying adjacent to the streak S and under the probe 24.

Therefore, while the wide probe may be used during regular sheet moisture measurement scans, it is necessary to reduce the sampled area to detect streak S. One way this can be accomplished, as shown in FIG. 5, is to remove one or several of the electrodes from the measuring circuitry of gauge 22. For example, one or more whole capacitance columns $a$ through $d$ (FIG. 3) can be removed by electrically decoupling or switching them from the input of the moisture measuring servo unit 44. Since the electrode pairs define a bank of capacitors, servo unit 44 may comprise a capacitance measuring bridge such as disclosed in U.S. Patent 3,155,900, issued to A. F. Hanken and assigned to the same assignee as the present invention.

The electrodes 42 are preferably recessed in the face of the probe 24. The electrode pairs of each column $a$–$d$ are connected in parallel by grounding one electrode in each pair and connecting the other electrodes to a common line 43. The common lines of each capacitance column are connected to a different terminal of a four terminal switch 46. The rotor 48 of switch 46 is controlled by the recorder knob 40 and serves to connect the common line of each capacitance column $a$–$d$ in common with the input of the moiture measuring servo 44.

OPERATION OF THE PRESENT INVENTION

With the control knob 40 in the position shown, all of the electrodes 42 in the probe 24 are effectively coupled to the input of the moisture measuring servo 44. Moisture measuring servo unit 44 generates at the output shaft 44a an angular shaft displacement proportional to the amount of moisture in the sheet 20 directly under the probe 24. This causes a recorder chart drive 50 to reciprocate the chart drive roll 52 back and forth in accordance with the moisture content being measured. The scanning controller 30 moves the carriage 26 across the sheet carrying the probe 24 along with it. This motion is transmitted to the recording pen 54 of a chart recorder 34. A cross-sheet moisture content or profile of the sheet 20 is indicated by the irregular trace 56 on the chart 38. It is not readily apparent from the trace 56 that any moisture streaks exist. To check the presence of longitudinal moisture streaks, the operator turns the knob 40 in a clockwise direction to increase the speed of response of the gauge. When control knob 40 is turned in this direction, the rotor of switch 46 disconnects electrode columns $b$, $c$, and $d$, depending on how far clockwise knob 40 is turned. The fastest cross-sheet response is provided in a full clockwise direction whereby only electrode column $a$ is connected to the input of the moisture measuring servo 44. At this point, before another scan across the sheet is initiated by the scanning control unit 30, a chart indexing unit 58 may be provided to step the recorder chart 38 a greater amount to separate sufficiently two successive traces on the chart recorder 34. Now when a trace is drawn on chart 38, a peak 56a in the trace 56 is noted illustrating the location of a very wet moisture streak near the left-hand edge of the sheet 20 as viewed in FIG. 2. In some cases, it may be more desirable to position the control 40 somewhere in the middle of its range whereby only one or two capacitance columns are uncoupled from the measuring servo 44 or to uncouple the outermost columns $a$ and $d$ first.

ALTERNATIVE CONSTRUCTIONS

The streak detection system shown in FIG. 5 is capable only of resolving streaks in a longitudinal direction down the sheet. It may be more desirable to use an alternative system whereby not only machine direction but also cross direction streaks are detectable. Such a system is illustrated in FIG. 6 and is typical of only one of many constructions that provide this result.

This technique uses a moisture probe 60 having two sets. A and B, of electrode pairs 61. Electrode set A, comprising four electrode pairs 61A, are aligned in the direction of travel of the sheet as indicated by the large arrow. Set B comprises a single electrode pair 61B aligned in the cross-sheet direction. The electrode pair sets A and B terminate in conductors 62 and 64 respectively. A mode selector knob 66 selects one of three functions labeled Reg., C–D streak, and M–D streak referring to regular moisture, cross-sheet direction streak, and machine direction streak respectively. These three functions correspond to positions 1, 2, and 3 of switch decks 66A and 66B coupled together by the dotted line 68 to the knob 66. The rotor or pole terminal of switch deck 66A is connected to a source of A.C. potential 70 used to supply a motor or other means 72 used to rotate the probe 60 through an angle of 90 degrees. The pole terminal of deck 66B is connected to the input of the moisture servo unit 44.

OPERATION OF ALTERNATIVE CONSTRUCTION

With the mode selector knob 66 set in the position shown, a regular moisture measurement is made by coupling all of the electrodes in set A into the moisture measuring servo 44. If it is desired to detect cross-sheet streaks, that is, a streak that is transverse to the direction of travel of the sheet, then the mode selector knob 66 is placed in the middle position and electrode set B is connected into the servo unit. It can be seen that this provides a relatively narrow effective sampling area or width in the direction of sheet travel.

If no streaks are found lying in the cross-sheet direction, the mode selector may be thrown to the last position to detect longitudinal or machine direction streaks in the sheet 20.

In this mode, switch deck 66A couples the supply 70 to the rotator 72 and the entire probe 60 rotates 90 degrees, thereby aligning the electrode pair in set B in the direction of sheet travel. Electrode set B, however, is still coupled into the moisture measuring servo unit, but the thin dimension of the sampling area is oriented in a cross-sheet direction. This enables the system to resolve longitudinal or machine direction streaks with a high degree of accuracy. It is not only possible to determine, with a high degree of accuracy, the response of streaks in the machine direction and cross-machine direction, but it is also possible to orient the probe 60 at other angles relative to the direction of sheet travel to detect streaks that lie at other angles. In most applications of this type, the gauge may find most common use in a single point mode of operation.

Another way in which existing probes may be modified to provide the narrow streak detecting function described above is through the use of prewired printed circuit boards. The printed circuit boards may be provided with input and output connections that mate with the electrodes 42 and the input of the moisture measuring equipment. The desired connections can be made on the printed circuit board and a number of them can be wired up and slipped in-between the electrodes 42 and the input of the moisture measuring equipment terminals to select any desired combination of electrode pairs to provide the emphasized response to streaks in the sheet. Other techniques will be apparent to those skilled in the art.

SUMMARY

In summarizing, I have provided a new method for increasing the response of a moisture measuring system to rapid variations in moisture content of a sheet such as wet streaks. This is provided by using a probe with a narrow sampling dimension that moves substantially perpendicular to the longitudinal extent of the moisture streak. Although there are many different ways of implementing this method, I have illustrated several techniques utilizing a preferred multiple electrode dielectric probe which I have found to provide advantages not found in other types of probe. Moreover, I have described flexible alternative constructions that provide a high degree of versatility of measurement.

Although certain specific embodiments of the invention have been shown and described herein, many modifications may be made thereto without departing from the true spirit and scope of the invention.

What is claimed is:

1. Apparatus for detecting relatively narrow moisture streaks extending longitudinally down a sheet, comprising:
   a probe movable relative to said sheet and having
      a face shape positioned adjacent to said sheet,
      a multiplicity of electrode pairs provided in the face of said probe,
      said multiplicity of electrode pairs being arranged in a plurality of adjacent columns,
      said columns being displaced relative to each other at right angles to the direction of the moisture streaks and having longitudinal axes running in substantially the same direction as the longitudinal streaks,
      each of said columns including several of said electrode pairs running in the same direction as the longitudinal streaks,
      said several electrode pairs in each column being connected in parallel,
      whereby there is provided a plurality of electrode pair columns,
   a moisture measuring circuit having an input and an output,
   means for orienting said probe relative to said sheet to position said electrode pair columns parallel to said moisture streak,
   switch means for selectively connecting a different number of said electrode pair columns in parallel with said input of said measuring circuit to emphasize the response of said moisture measuring circuit to said moisture streaks, and
   indicator means connected to said output of said measuring circuit to display said emphasized response to said moisture streak.

2. A method of detecting relatively narrow streaks and the average value over a relatively wide region of a property controlling the electric impedance of a sheet material traveling in a predetermined direction with a single probe having an electric impedance sensing region across the sheet width much greater than the width of said streaks and equal to the wide region, said probe including a multiplicity of electric impedance monitoring electrodes connected in parallel circuits, pairs of said electrodes for monitoring the sheet impedance being positioned at disparate points across the sheet width of right angles to the direction of sheet travel, comprising the step of at will varying the number of said electrode pairs connected in parallel so that all of said pairs are connected in parallel while the average value is being measured and the number of electrode pairs connected in parallel while the presence of a streak is being detected is less than the total number of electrode pairs to reduce the effective cross sheet measuring area of the probe.

3. A method of detecting relatively narrow moisture streaks and the average moisture value over a relatively wide region of a property of a sheet traveling in a predetermined direction, said property being detected by monitoring the impedance of the sheet to electric energy, comprising the steps of applying a predetermined amount of said energy in parallel to each of a plurality of closely spaced regions across a portion of the sheet width, said portions having a span equal to the width of the wide region, detecting the electric impedance of all of said regions together to derive the average moisture value, reducing the number of said regions to which the energy is applied in parallel, and detecting the electric impedance of the reduced number of regions to derive an indication of the presence of a moisture streak.

4. The method of claim 3 wherein the number is reduced by rotating a probe having two groups of electrode pairs for applying the energy to the sheet, one of said groups having a greater number of pairs than the other of said groups, said groups being positioned at a predetermined angle with respect to each other, said probe being rotated by said angle, each of the electrodes in said groups being fixedly positioned relative to each other.

5. The method of claim 3 wherein the number is reduced by changing the number of regions from which the absorbed energy is detected.

6. Apparatus for detecting relatively narrow moisture streaks and the average moisture value over a relatively wide region of a property of a sheet traveling in a predetermined direction, said property being detected by monitoring the impedance of the sheet to electric energy, comprising means for applying a predetermined amount of said energy in parallel to each of a plurality of regions spaced across a portion of the sheet width, said portion having a span across the sheet width equal to the width of the wide region, means for reducing the number of said regions, and means selectively connected to said applying means for indicating the electric impedance of the sheet in said region for all of the regions and for the reduced number of regions, whereby the electric impedance of all of said regions while said energy is applied in parallel to each of said regions is indicative of the average moisture value over a relatively wide region and the electric impedance of the sheet with the number of regions reduced is indicative of the presence and absence of a relatively narrow moisture streak.

7. The apparatus of claim 6 wherein said means for applying includes a probe having first and second sets of electrode pairs positioned at a predetermined angle with respect to each other, each of the electrodes in said sets being fixedly positioned with respect to each other, the regions monitored by the first and second sets being related to the widths of the wide region and streak, respectively, and means for selectively rotating through said angle the position of said probe relative to the sheet travel direction.

8. The apparatus of claim 6 wherein said means for applying includes a probe having first and second sets of electrode pairs positioned at a predetermined angle with respect to each other, each of the electrodes in said sets being fixedly positioned with respect to each other, the region monitored by the first and second sets being related to the widths of the wide region and streak, respectively, means for at will rotating through said angle the position of said probe relative to the sheet travel direction, and means for selectively connecting said first and second electrode pairs to said indicating means.

9. The apparatus of claim 6 wherein said means for applying includes a probe having first and second sets of electrode pairs positioned at a predetermined angle with respect to each other, each of the electrodes in said sets being fixedly positioned with respect to each other, the region monitored by the first and second sets being related to the widths of the wide region and streak, respectively, means for at will rotating the position of said probe relative to the sheet travel direction through said angle, means for selectively connecting said first and second electrode pairs to said indicating means, said connecting means including means for connecting the first set to said indicating means in only one of the angular positions of the probe, and means for connecting the second set to said indicator means in both angular positions of the probe.

10. The apparatus of claim 6 wherein said means for applying includes a plurality of electrode pairs, each of said pairs being disposed at a different location at right angles to the direction of sheet travel, all of the electrodes in the pairs being fixedly positioned with respect to each other, and said means for reducing includes means for at will varying the number of said electrode pairs feeding said energy to said indicating means.

11. The apparatus of claim 6 wherein said means for applying includes a plurality of electrode pairs, each of said pairs being disposed at a different location at right angles to the direction of sheet travel, all of the electrodes in the pairs being fixedly positioned with respect to each other, and said means for reducing includes switch means for at will varying the number of said electrode pairs connected to said indicating means.

References Cited

UNITED STATES PATENTS

| 1,623,436 | 4/1927 | Peschl | 324—65 XR |
| 2,616,068 | 10/1952 | McDonald | 324—61 XR |

FOREIGN PATENTS 723,885  12/1965  Canada.

EDWARD E. KUBASIEWICZ, Primary Examiner

U.S. Cl. X.R.

250—83.3